US012442576B2

(12) United States Patent
Moczygemba et al.

(10) Patent No.: US 12,442,576 B2
(45) Date of Patent: Oct. 14, 2025

(54) ICE FORMATION

(71) Applicant: II-VI DELAWARE, INC., Wilmington, DE (US)

(72) Inventors: Joshua Moczygemba, Winona, TX (US); Jason Mefford, Garland, TX (US)

(73) Assignee: II-VI DELAWARE, INC., Wilmington, DE (US)

( * ) Notice: Subject to any disclaimer, the term of this patent is extended or adjusted under 35 U.S.C. 154(b) by 62 days.

(21) Appl. No.: 18/358,599

(22) Filed: Jul. 25, 2023

(65) Prior Publication Data

US 2023/0366603 A1 Nov. 16, 2023

Related U.S. Application Data

(62) Division of application No. 16/843,788, filed on Apr. 8, 2020, now Pat. No. 11,747,067.

(51) Int. Cl.
*F25C 1/20* (2006.01)
*F25C 1/04* (2018.01)
*F25C 5/08* (2006.01)

(52) U.S. Cl.
CPC ............. *F25C 1/20* (2013.01); *F25C 1/04* (2013.01); *F25C 5/08* (2013.01)

(58) Field of Classification Search
CPC ............. F25C 1/20; F25C 5/08; F25C 1/04
See application file for complete search history.

(56) References Cited

U.S. PATENT DOCUMENTS 5,946,924 A * 9/1999 Kim .................. F25C 1/04
62/189
2009/0049845 A1 2/2009 Mcstravick et al.
2014/0165618 A1 * 6/2014 Culley .................. F25C 1/18
62/71
2014/0216072 A1 8/2014 Matsumoto
2018/0231294 A1 * 8/2018 Song .................. F25C 5/185
2019/0212047 A1 * 7/2019 Shao .................. F25C 1/18
2019/0360736 A1 * 11/2019 DuPlessis .............. F25D 17/06

FOREIGN PATENT DOCUMENTS

JP H09303831 A * 11/1997
WO 2006088891 A2 8/2006

OTHER PUBLICATIONS

Translated_Isao (Year: 1997).*

* cited by examiner

*Primary Examiner* — Elizabeth J Martin
*Assistant Examiner* — Samba Gaye
(74) *Attorney, Agent, or Firm* — Blank Rome LLP

(57) ABSTRACT

The seed crystal chamber 142 may be located closer to the cold plate 112 than the mold chamber 137. The seed crystal chamber 142 may facilitate formation of a seed ice crystal from which the clear ice may form. By taking advantage of the lower thermal conductivity of water as compared to ice or aluminum, the seed crystal chamber 142 may further discourage the water in the mold chamber 137 from sub cooling and flash freezing as the seed crystal is being formed. Flash freezing occurs when water is subcooled below its freezing point and then exposed to an ice crystal, which causes the subcooled water to rapidly freeze. The seed crystal chamber 142 may promote directional freezing in the mold chamber 137, which promotes clear ice. Thermal conductivity of ice is higher than that of water, which may facilitate freezing from the seed crystal chamber 142 up through the mold chamber 137 once the seed crystal is formed.

10 Claims, 5 Drawing Sheets

ICE FORMATION

CROSS-REFERENCE TO RELATED APPLICATIONS

The present is a divisional of U.S. patent application Ser. No. 16/843,788 filed Apr. 8, 2020. The aforementioned application is hereby incorporated by reference in its entirety.

BACKGROUND

Cloudy ice is formed as a result of impurities being trapped within water as it freezes. These impurities typically include dissolved gases and minerals. The cloudiness of the ice forms when these impurities are trapped as water molecules form into the crystal lattice of the ice. The misaligned crystals refract ambient light back out instead of allowing the light to pass directly through, giving the ice an opaque appearance. Conventional ice making techniques generally result in cloudy ice.

Commercially available clear ice is not readily convenient or practical for home or personal use on a small scale. Commercially available clear ice may be inconvenient and costly, particularly in shapes such as spheres. Appliances that can form clear ice are compressor-based, expensive, large, heavy, and limit the shape and size of the clear ice to be formed. These appliances are impractical for home or personal use. The devices and techniques available for home or personal use require significant time and preparation while failing to consistently produce clear ice.

The claimed subject matter is not limited to embodiments that solve any disadvantages or that operate only in environments such as those described above. This background is only provided to illustrate examples of where the present disclosure may be utilized.

SUMMARY

In some configurations, a frozen substance maker may include a heat pump, a cold plate, a mold base, a mold top, and an agitator. The cold plate may be in thermal communication with the heat pump. The mold base may be positioned on the cold plate. The mold base and the cold plate may define a seed crystal chamber. The mold top may be positioned on the mold base. The mold base and the mold top may define a mold cavity in fluid communication with the seed crystal chamber. The mold top may define an overflow reservoir in fluid communication with the mold chamber. The agitator may be located at least partially within the overflow reservoir.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

DETAILED DESCRIPTION

Figure 1A:
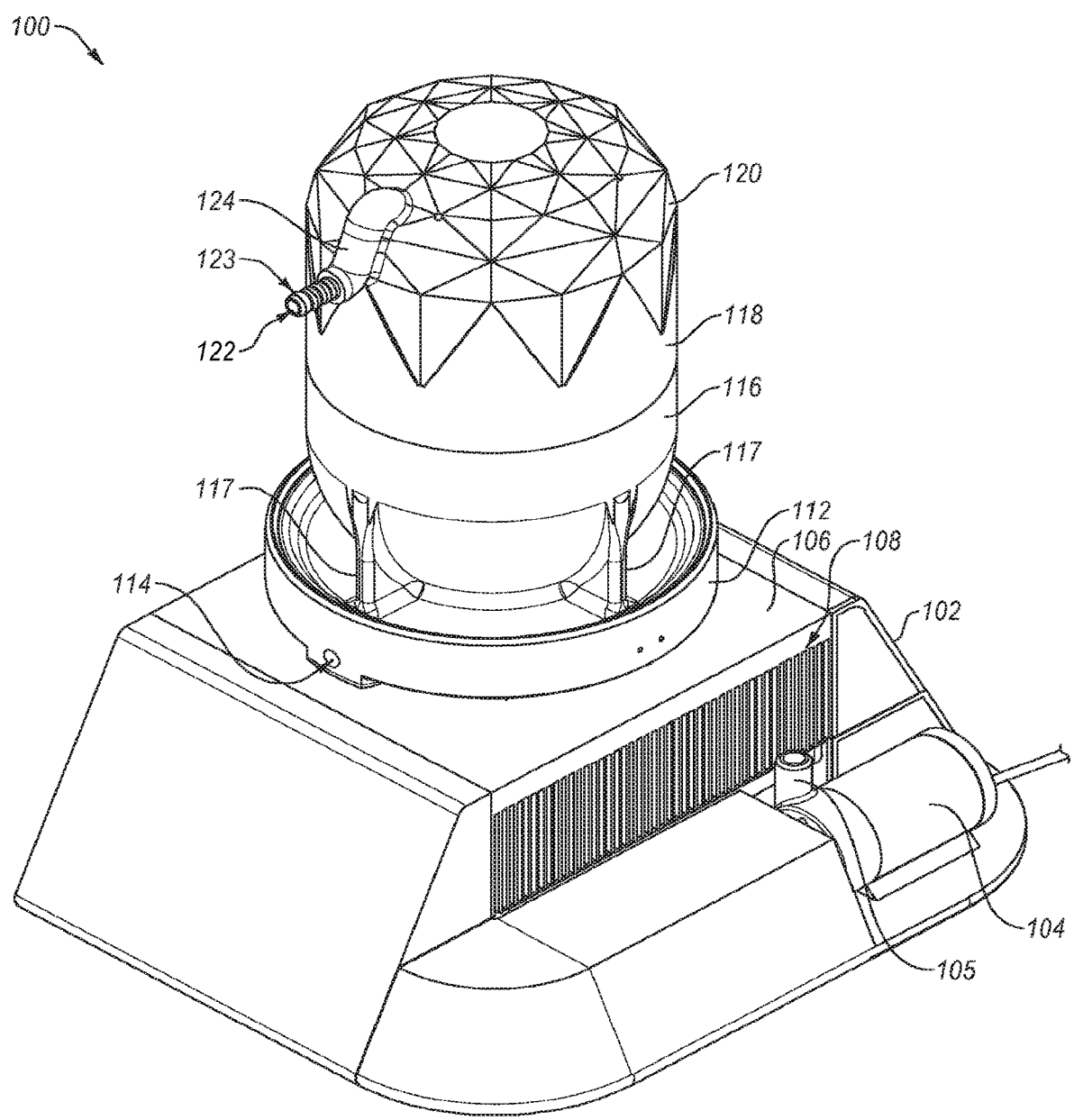
FIG. 1A illustrates a top perspective view of an example frozen substance maker.

An example of a frozen substance with aligned crystals is clear ice. Clear ice generally does not include impurities in the crystal lattice formed by water molecules. Because the crystal lattice does not include impurities, clear ice is less cloudy and may be purer than traditional ice. The crystals in the crystal lattice of clear ice are larger than the crystals in conventional ice. The crystals of conventional ice contain impurities, which refract light and result in a cloudy or opaque appearance.

The terms "ice" or "clear ice" used herein are not limited to water. The terms "ice" or "clear ice" can be used to refer to any substance that can be frozen using the methods and apparatuses described herein. For example, substances such as tonic water, tea, juices, or any other suitable substance can be frozen such that the crystal lattice is aligned. The term "water" is used to reference liquid water, although any other suitable substance in liquid form may be used. Furthermore, the terms "freezing" and "removing heat" can be used interchangeably. As is known in heat transfer, the process of cooling involves the transfer of heat away from the substance being frozen.

Frozen substances with aligned crystals such as clear ice have a variety of benefits. For example, clear ice can be used in carbonated beverages to reduce the release of dissolved carbon dioxide from the beverage. Cloudy ice contains minerals, gases, or other impurities that are released into the beverage as the cloudy ice melts. The impurities contaminate the beverage and create nucleation sites upon melting that result in foaming and fizzing. Clear ice does not contain the impurities, resulting in decreased foaming and fizzing of carbonated beverages. Furthermore, clear ice may be preferable in some scenarios for aesthetic reasons. The present disclosure provides a compact, light-weight apparatus that is convenient, economical, and versatile for home or personal use that consistently produces clear ice.

In directional freezing, ice crystal formation starts at a surface and continues in a single direction. Directional freezing forces impurities out of the crystal lattice as it is formed, leaving aligned crystals that do not refract light.

In cascade freezing, a frozen substance can be formed with an aligned crystal lattice when a liquid substance continuously flows, or cascades, over a freezing outer surface. The action of the cascading liquid substance removes the dissolved impurities before they can become trapped in the crystal lattice, leaving aligned crystals.

Most conventional implementations of forming clear ice utilize cascade freezing. Artificially creating clear ice using cascade freezing may include the use of a reservoir and a pump to maintain the continuous flow water over the freezing surface. This method has several disadvantages. For example, the pump, which may run consistently as the ice forms, may be relatively loud. Furthermore, the pump and the cascade freezing apparatus may take up a substantial amount of space.

Figure 1B:
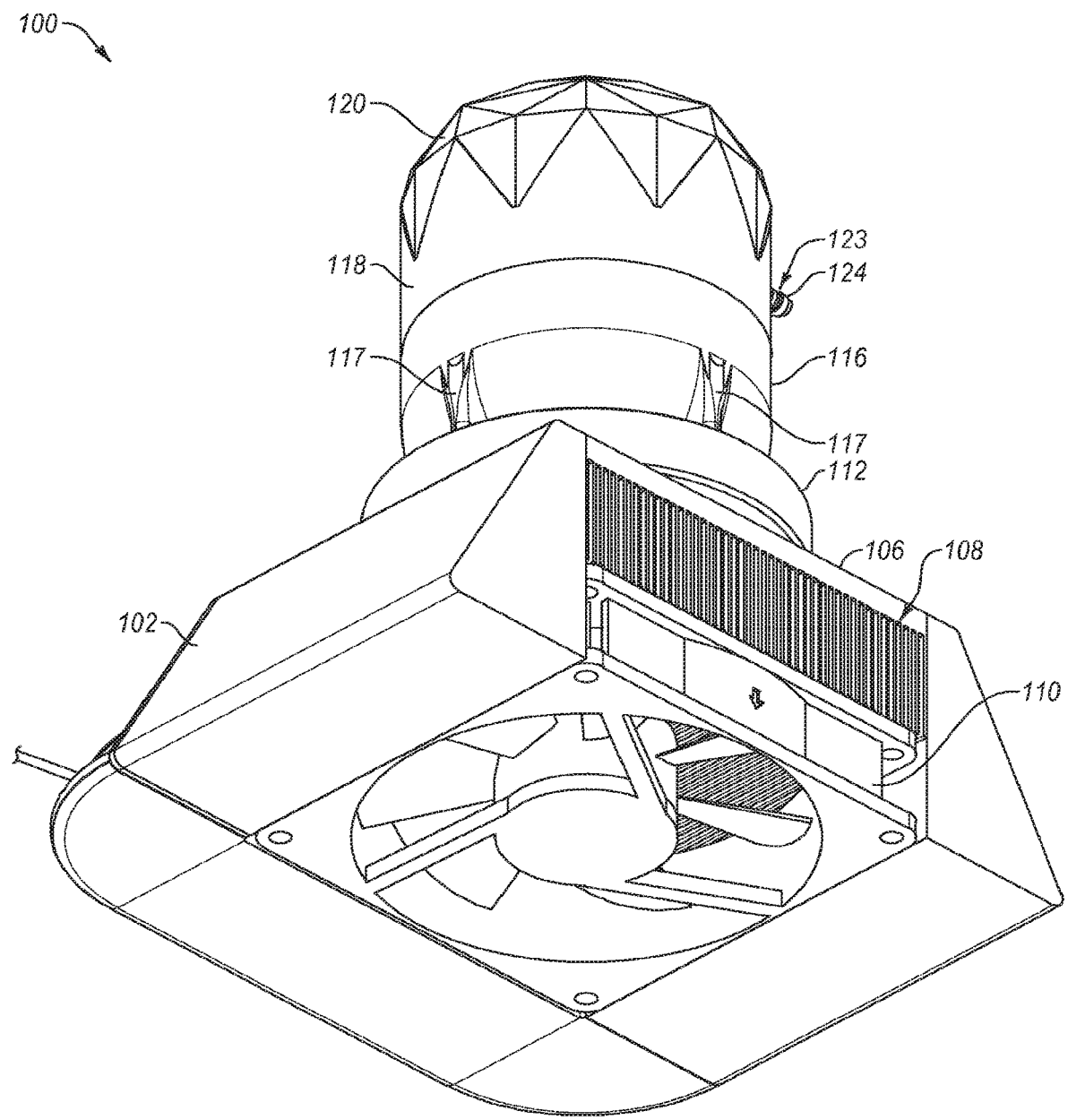
FIG. 1B illustrates a bottom perspective view of the frozen substance maker of FIG. 1A.
Figure 1C:
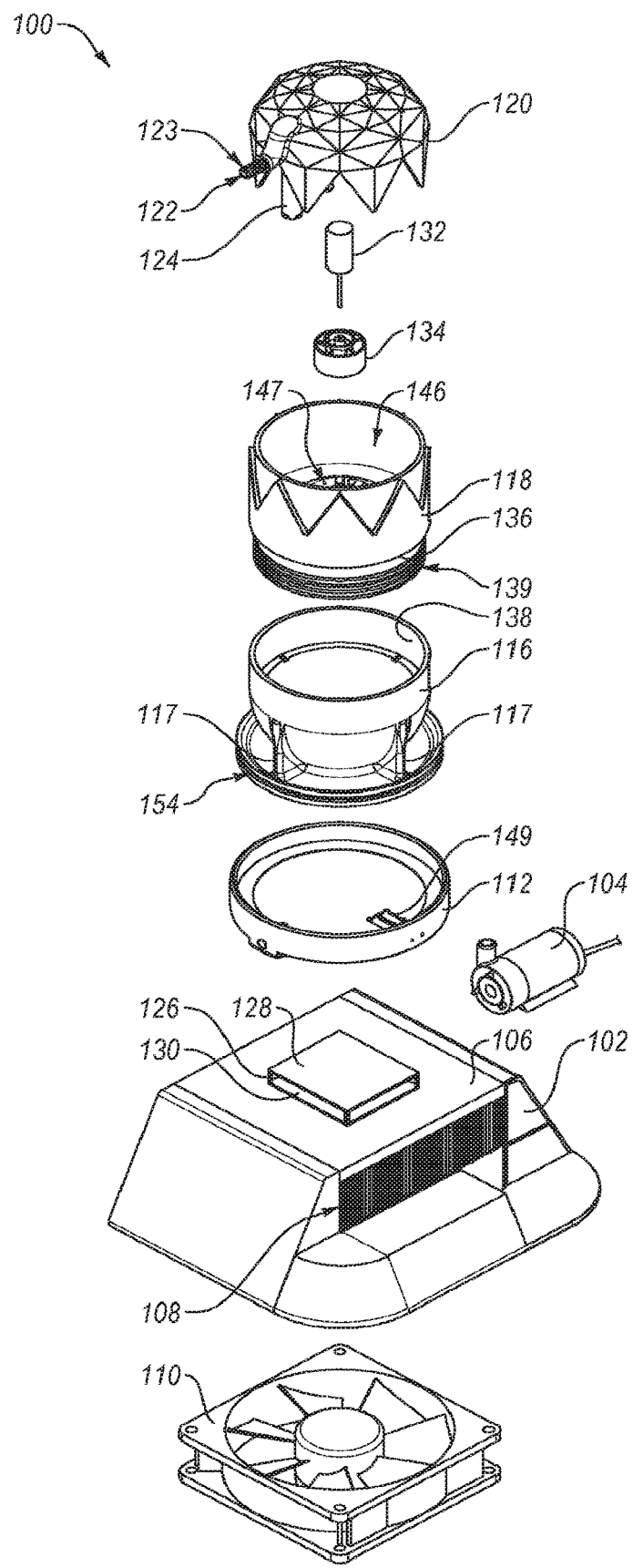
FIG. 1C illustrates a top perspective exploded view of the frozen substance maker of FIG. 1A.
Figure 1D:
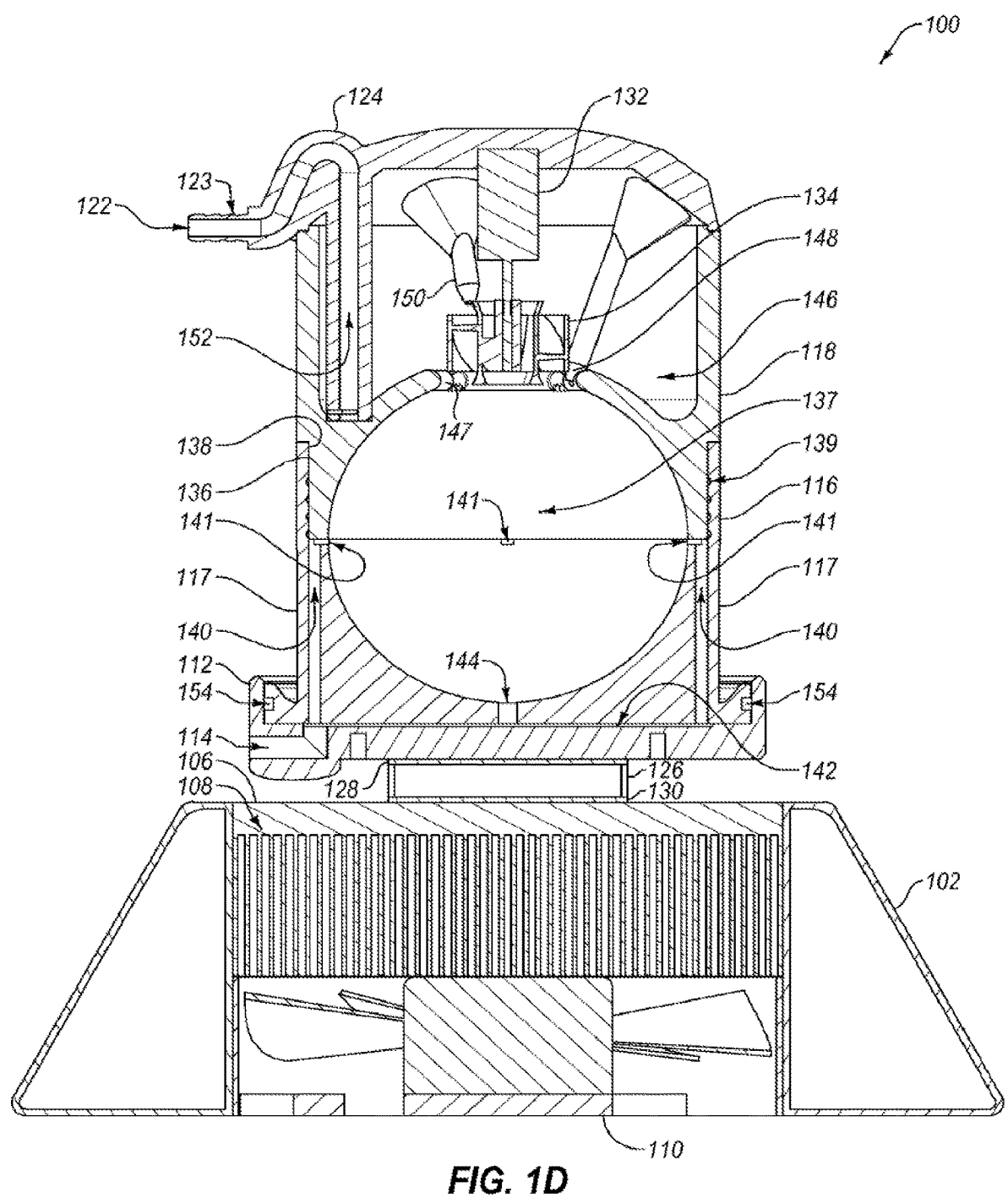
FIG. 1D illustrates a front cutaway view of the frozen substance maker of FIG. 1A.

FIG. 1A illustrates a top perspective view of an example frozen substance maker 100. FIG. 1B illustrates a bottom perspective view of the frozen substance maker 100. FIG. 1C illustrates a top perspective exploded view of the frozen substance maker 100. FIG. 1D illustrates a front cutaway view of the frozen substance maker 100.

In some embodiments, the frozen substance maker 100 may include one or more reservoirs for containing a supply of water for the frozen substance maker 100. For example, the frozen substance maker 100 may include a supply reservoir 102. In some configurations, the supply reservoir 102 may be configured to be selectively removed from the frozen substance maker 100 to facilitate a user filling the supply reservoir 102 with water.

The frozen substance maker 100 may also include a pump 104 for supplying water to or from the supply reservoir 102. In some embodiments, the pump 104 may include a two-way pump in fluid communication with the supply reservoir 102. For instance, the pump 104 may provide water from the supply reservoir 102 for the formation of ice and may return excess water to the supply reservoir 102 following ice formation. In some embodiments, multiple pumps may be employed. For example, in some configurations, a first pump may provide water from the supply reservoir 102 and a second pump may return excess water to the supply reservoir 102.

In some configurations, the supply reservoir 102 may be omitted and the frozen substance maker 100 may be supplied with water from an exterior source. For example, the frozen substance maker 100 may be supplied with water from a conventional residential water distribution system. In these and other configurations, excess water may be discarded following ice formation. For example, the excess water may be discarded to a residential drain system. Alternately or additionally, the pump 104 may be omitted and one or more valves may be employed to perform the functions of the pump.

The frozen substance maker 100 includes one or more heat pumps or cooling elements. For example, the frozen substance maker 100 may include a thermoelectric cooler (TEC) 126 (shown in FIGS. 1C and 1D), which may also be described as a Peltier cooler or a thermoelectric heat pump. During operation the TEC 126 consumes electrical energy, which causes heat to be transferred from one side of the TEC 126 to the other. The side from which the heat is transferred depends on the direction of an electrical current through the TEC 126. For instance, while operating in what is described herein as a cooling mode, an electrical current applied to the TEC 126 causes heat to be transferred from a first surface 128 of the TEC 126 to a second surface 130 of the TEC 126. While operating in what is described herein as a heating mode, the electrical current applied to the TEC 126 is reversed, which causes heat to be transferred from the second surface 130 to the first surface 128. Cooling mode may be associated with forming the clear ice. Heating mode may be associated with melting a portion of the clear ice after formation to facilitate removal of the clear ice from the frozen substance maker 100. In some embodiments, a vapor compression heat pump may be used in place of or in addition to the TEC 126. In some embodiments, placing the frozen substance maker 100 in a freezer may be used in place of a TEC and/or vapor compression active cooling approach.

In some embodiments, the frozen substance maker 100 may include a heat sink 106. The heat sink 106 may include fins 108 that face a fan 110 (shown in FIGS. 1B, 1C, and 1D). The heat sink 106 is in thermal communication with the second surface 130 of the TEC 126. For example, the heat sink 106 may form a thermally conductive connection with the second surface 130. Thus, for example, during cooling mode, heat may be transferred from the first surface 128 to the heat sink 106 via the second surface 130. In some configurations, a thermally conductive material such as thermally conductive paste may be located between the second surface 130 and the heat sink 106 to facilitate conduction of heat away from the second surface 130.

The fan 110 may be positioned such that the fan 110 may encourage air to flow past the fins 108. For example, the fan 110 may cause air from the environment to flow over the fins 108 of the heat sink 106 to encourage heat transfer from the heat sink 106 to the air of the environment via convection. Encouraging the transfer of waste heat from the TEC 126 to the environment may increase the efficiency of the TEC 126 while in cooling mode.

The frozen substance maker 100 may include a cold plate 112 in thermal communication with the first surface 128 of the TEC 126. During cooling mode, heat may be transferred from the cold plate 112 to the heat sink 106 via the first surface 128 and the second surface 130. In some configurations, a thermally conductive material such as thermally conductive paste may be located between the cold plate 112 and the first surface 128.

The cold plate 112 may include an inlet 114. Water may be supplied to the inlet 114. For example, the inlet 114 may be in fluid communication with a nozzle 105 of the pump 104, as described herein. For example, the frozen substance maker 100 may include a fluid conduit connecting the nozzle 105 to the inlet 114.

The frozen substance maker 100 may further include a mold base 116 and a mold top 118. In some embodiments, the mold base 116 may have relatively high thermal conductivity. For instance, in some configurations, the mold base 116 may include anodized aluminum. Optionally, the portion of the mold base 116 that faces a mold chamber 137 (shown in FIG. 1D) where the clear ice is formed may include a food-safe flexible/compliant coating, such as a silicone coating. The coating may discourage the clear ice from cracking as a result of thermal expansion and thermal contraction while the clear ice is in the mold chamber 137. For instance, the coating may discourage the clear ice from sticking to the wall of the mold base 116, which may otherwise promote cracking as a result of mismatches in coefficients of thermal expansion and temperature gradients.

The mold base 116 may be positioned on the cold plate 112. The mold base 116 and the cold plate 112 may be shaped and positioned such that a seed crystal chamber 142 (shown in FIG. 1D) is defined between the cold plate 112 and the mold base 116. The seed crystal chamber 142 is in fluid communication with the inlet 114. The frozen substance maker 100 may include a seed crystal chamber sensor 149 positioned in or adjacent to the seed crystal chamber 142. In some configurations, the seed crystal chamber sensor 149 may include a capacitive sensor. By way of example, the seed crystal chamber sensor 149 may sense the presence of air, the presence of water, and the presence of ice. For instance, the seed crystal chamber sensor 149 may sense when the seed crystal chamber 142 is empty, when the seed crystal chamber 142 contains water, and when the seed crystal chamber 142 contains ice. In some configurations, the seed crystal chamber sensor 149 may include a temperature sensor.

In some embodiments, the frozen substance maker 100 may include an ambient temperature sensor for sensing ambient conditions associated with an environment of the frozen substance maker 100. In some configurations, the ambient temperature sensor may prompt the frozen substance maker 100 to provide the user with an error alert if the ambient temperature sensor senses that the environment is too warm for making ice. For example, the frozen substance maker 100 may provide the user with an error alert should the user attempt to operate the frozen substance maker 100 outside on a hot summer day.

Disclosed frozen substance makers include a heat pump, a cold plate, a mold base, a mold top, and an agitator. An example cold plate is in thermal communication with the heat pump. An example mold base is positioned on the cold plate. Example mold bases and the cold plates may define a seed crystal chamber. An example mold top is positioned on the mold base. An example mold base and mold top define a mold cavity in fluid communication with the seed crystal chamber. An example mold top defines an overflow reservoir in fluid communication with the mold chamber. An example agitator is located at least partially within the overflow reservoir.

The mold base 116 may define an O-ring channel 154 (shown in FIGS. 1C and 1D), which may receive an O-ring that may discourage water or other liquids from escaping from the frozen substance maker 100 via an interface between the cold plate 112 and the mold base 116. The mold base 116 may be removable relative to the cold plate 112 to facilitate cleaning of the mold base 116 and at least a portion of the cold plate 112. For instance, removal of the mold base 116 may facilitate cleaning of the portion of the cold plate 112 bordering the seed crystal chamber 142. Employing an O-ring may facilitate swapping mold assemblies by a user. For example, mold assemblies that generate different clear ice shapes may be selectively installed.

The mold base 116 may include fill conduits 117, which define fill channels 140 (shown in FIG. 1D), which are in fluid communication with the seed crystal chamber 142. The mold base 116 may further define fill vents 141, which are in fluid communication with the mold chamber 137 and the fill channels 140. The fill vents 141 may facilitate the expulsion of air from the seed crystal chamber 142 as the seed crystal chamber 142 is filled with water. The mold base 116 may further define a seed crystal conduit 144 (shown in FIG. 1D), which is in fluid communication with the seed crystal chamber 142 and the mold chamber 137. The seed crystal conduit 144 may be straight or angled to match the lattice structure of the seed crystal and to promote a desired ice grain orientation as the ice grows into the mold chamber 137.

The mold top 118 may have relatively low thermal conductivity compared to the mold base 116. For instance, in some configurations, the mold top 118 may include a flexible/compliant material, such as silicone. The relatively high thermal conductivity of the mold base 116 and the relatively low thermal conductivity of the mold top 118 may promote the formation of clear ice. For example, the arrangement may promote an ice growth profile that forms ice from the bottom up while discouraging water from becoming encapsulated within the ice. Water encapsulated within the ice, which may be more likely to occur if the mold base 116 and the mold top 118 are both thermally conductive, may result in cloudy ice.

The mold top 118 may be selectively positioned relative to the mold base 116. For instance, the mold base 116 may include a mating surface 136 (shown in FIGS. 1C and 1D) that may mechanically mate with a counterpart mating surface 138 (shown in FIGS. 1C and 1D) of the mold base 116. By way of example, the mating surface 136 of the mold top 118 and the counterpart mating surface 138 of the mold base 116 may form a press-fit connection to facilitate a fluid-tight connection between the mold base 116 and the mold top 118. In some embodiments, the mating surface 136 may include ribs 139 (shown in FIGS. 1C and 1D) that may encourage a fluid-tight connection between the mold base 116 and the mold top 118. Optionally, the counterpart mating surface 138 may define counterpart grooves for receiving the ribs 139.

Together, the mold base 116 and the mold top 118 may define the mold chamber 137. The mold chamber 137 is where the clear ice is formed by the frozen substance maker 100. The shape of the mold chamber 137 is associated with the shape of the clear ice produced by the frozen substance maker 100. The mold chamber 137 is shown as having a spherical shape. However, a variety of other shapes are possible. For instance, in some configurations the mold chamber 137 may have a cuboid shape, a cylindrical shape, a pyramidal shape, or the like.

Alternately or additionally, the mold chamber 137 may define shapes to be imprinted on the resulting clear ice. Alternately or additionally, the mold chamber 137 may define details that cause the resulting clear ice to exhibit an appearance of text, of images, or the like. The details of the mold chamber 137 may be defined such that the details facilitate the removal of the resulting clear ice from the mold chamber 137. For instance, the details of the mold chamber 137 may be oriented such that the clear ice may not be obstructed by the details of the mold chamber 137 as the clear ice is removed from the mold chamber 137. By way of example, the mold chamber 137 may define details that cause the resulting clear ice to exhibit an appearance of a basketball, a baseball, a soccer ball, a bowling ball, a golf ball, an American football, a hockey puck or the like. Alternately or additionally, the mold chamber 137 may define details that cause the resulting clear ice to exhibit a sports team name and logo, a business name and logo, a themed message such as "happy birthday," or the like.

In some embodiments, details may be introduced to the clear ice after the clear ice is removed from the frozen substance maker 100. For instance, images such as logos, decals, emblems, or the like may be melted into the clear ice or may otherwise be added to the clear ice. In some configurations, a stamp device may include a shaped stamp that creates an image in the clear ice when the contours of the shaped stamp are melted into the ice. In some embodiments, the shaped stamp of the stamp device may be formed from metal and may be heated such that the shaped stamp may melt the clear ice when pressed against the clear ice.

The mold top 118 may define an overflow reservoir 146 (shown in FIGS. 1C and 1D). The overflow reservoir 146 may be in fluid communication with the mold chamber 137 by way of an opening 147 (shown in FIGS. 1C and 1D) defined by the mold top 118. The overflow reservoir 146 may be at least partially filled while the clear ice is in the process of forming within the mold chamber 137. By way of example, the overflow reservoir 146 may contain a suitable amount of water to at least partially submerge an agitator 134 (shown in FIGS. 1C and 1D) such that the agitator 134, which may be positioned above the mold chamber 137, may encourage the water to circulate while the agitator 134 is rotated. The overflow reservoir 146 may be drained of the remaining water in response to clear ice having formed in the mold chamber 137. Draining the water from the overflow reservoir 146 in response to the clear ice being formed may facilitate removal of the clear ice and may discourage freezing the agitator 134 in ice.

In some embodiments, the frozen substance maker 100 may include a cap 120. In some embodiments, the cap 120 may be shaped to be selectively positioned on the mold top 118. For instance, the cap 120 may be removed from the mold top 118 such that a user may clean the mold top 118 or may access the mold top 118 to remove the mold top 118 and the clear ice from the frozen substance maker 100. Alternately or additionally, a user may remove the cap 120 and the mold top 118 from the mold base 116 as a unit to access the clear ice. In some configurations, the mold top 118 may be constructed from a flexible/compliant material, such as silicone. In these and other configurations, the clear ice may release from the mold base 116 more readily than the mold top 118. Thus, for example, a user may remove the mold top 118 from the mold base 116 with the clear ice remaining partially in the mold top 118. The user may subsequently use the mold top 118 to position the clear ice at a desired location, such as in a glass or an ice storage container, and may manipulate the mold top 118 to encourage the clear ice to separate from the mold top 118. For instance, the mold top 118 may facilitate removing the clear ice from the frozen substance maker 100 without the user contacting the clear ice directly. In some configurations, the mold top 118 may facilitate melting decals, emblems, logos, or the like into the clear ice by a user without requiring that the user contact the clear ice directly.

The cap 120 may include a mold sensor 148 (shown in FIG. 1D). The mold sensor 148 may be positioned near or within the opening 147 defined by the mold top 118. In some configurations, the mold sensor 148 may include a capacitive sensor. By way of example, the mold sensor 148 may sense the presence of air, the presence of water, and the presence of ice. For instance, the mold sensor 148 may sense when the mold chamber 137 is not full, when the mold chamber 137 is full of water, and because water in the mold chamber 137 freezes from the seed crystal chamber 142 up, when the mold chamber 137 is filled with ice.

In some embodiments, the cap 120 may include an overflow reservoir sensor 150 (shown in FIG. 1D). The overflow reservoir sensor 150 may include a capacitive sensor. By way of example, the overflow reservoir sensor 150 may sense the presence of air, the presence of water, and the presence of ice. The location of the overflow reservoir sensor 150 may correspond to a level of water in which the agitator 134 may operate. For instance, the overflow reservoir sensor 150 may sense when the water level is not to the level where the agitator 134 may be suitably submerged and when the water level is to the level where the agitator 134 is suitably submerged. The overflow reservoir sensor 150 may also sense when the ice level has reached the overflow reservoir sensor 150, although the ice may not reach the overflow reservoir sensor 150 during normal operation.

The cap 120 may include a motor 132 that drives the agitator 134. In some embodiments, the agitator 134 may include a push-pull impeller. The motor 132 and agitator 134 may facilitate water circulation that effectively removes oxygen buildup from an ice/water interface as freezing occurs. Agitation may significantly increase the rate of clear ice production, as agitation may encourage removal of oxygen from the water at a relatively high rate, particularly relative to the rate at which oxygen may diffuse through the water without agitation. For instance, achieving comparably clear ice without agitation may be done over a relatively longer period of time such that the rate of ice formation may not outstrip the rate at which the oxygen diffuses through natural forces. The agitator 134 may circulate water within the mold chamber 137 by way of the fluid communication facilitated by the opening 147. For example, the motor 132 and the agitator 134 may discourage oxygen entrapment that may occur in the absence of agitation. Oxygen entrapment may cause cloudy funnels to occur within the ice where oxygen was not effectively flushed from the water. In some configurations, a push/pull impeller may generate an efficient water circulation profile for discouraging oxygen buildup at the ice/water interface. In some embodiments, the agitator 134 may be rotated at 800-1000 RPM to encourage circulation rates that effectively discourage oxygen buildup at the ice/water interface.

The cap 120 may further include a fill/drain conduit 124. The fill/drain conduit 124 may define a fill/drain channel 152. The fill/drain channel 152 may be in fluid communication with the overflow reservoir 146 and with an outlet 122. The outlet 122 may be in fluid communication with the nozzle 105 of the pump 104. For example, a fluid conduit, omitted from the figures for clarity, may connect to the outlet 122 and to the nozzle 105. In some configurations, the outlet 122 may be in further fluid communication with the inlet 114. For example, the fluid conduit may connect to the nozzle 105, to the inlet 114, and to the outlet 122. For instance, a T-shaped fluid conduit junction (T-junction) or another 3-way fluid conduit junction may be employed. The fluid conduit may include a flexible portion to facilitate removing the cap 120 from the frozen substance maker 100 such that a user may access clear ice formed in the mold chamber 137. The fill/drain conduit 124 may include ribs 123 adjacent to the outlet 122 for encouraging the fluid conduit to stay in place on the fill/drain conduit 124.

In an example operation, the frozen substance maker 100 may fill the mold chamber 137 with water by operating the pump 104 such that water is drawn from the supply reservoir 102 through the pump 104, which expels the water from the nozzle 105 and through a fluid conduit to the inlet 114 of the cold plate 112. In some embodiments, the supply reservoir 102 may be selectively removable from the frozen substance maker 100 to facilitate a user filling the supply reservoir 102 with water, cleaning the supply reservoir 102, or the like. From the inlet 114, the water enters the seed crystal chamber 142, the fill channels 140 and the seed crystal conduit 144. As the pump 104 continues to pump the water, the water fills the fill channels 140 and fills the mold chamber 137 from the seed crystal conduit 144 until the water level reaches the fill vents 141, at which point the mold chamber 137 continues to fill from the seed crystal conduit 144 and the fill vents 141. Filling the mold chamber 137 from the seed crystal conduit 144 and the fill vents 141 may encourage the mold chamber 137 to fill from the bottom, which may encourage air to be expelled from the mold chamber 137. For instance, by discouraging air bubbles from remaining on the walls of the mold chamber 137, the resulting clear ice may be in substantially devoid of cavitation. In some configurations, the frozen substance maker 100 may fill the mold chamber 137 with water by operating the pump 104 such that water is drawn from the supply reservoir 102 through the pump 104, which expels water from the nozzle 105 through the fill/drain conduit 124 into the overflow reservoir 146, through the opening 147, into the mold chamber 137, and into the seed crystal chamber 142.

In response to the overflow reservoir sensor 150 determining that the water has reached the overflow reservoir sensor 150, the pump 104 may cease pumping water from the supply reservoir 102 to the seed crystal chamber 142, the mold chamber 137, and the overflow reservoir 146. The TEC 126 may further operate in cooling mode to transfer heat from the cold plate 112 to the heat sink 106 to begin ice making. The first sequence in the ice making process is the formation of the seed crystal in the seed crystal chamber 142. During the formation of the seed crystal, the agitator 134 may not be activated in order to allow a thermal gradient to develop in the water in the assembly, with the coldest point in contact with the cold plate 112 and the warmest point at the top of the overflow reservoir 146. This thermal gradient may prevent subcooling and flash freezing of the water in the mold chamber 137 and overflow reservoir 146. The fan 110 may begin operation to encourage cooling of the heat sink 106 while the TEC 126 is in cooling mode.

In response to the seed crystal chamber sensor 149 determining that the water in the seed crystal chamber 142 has formed ice, the motor 132 may begin operation to cause the agitator 134 to circulate the water within the mold chamber 137. In some embodiments, operation of the motor 132 may be delayed to encourage the ice seed crystal in the seed crystal chamber 142 to form to a sufficient degree such that the circulation of the water does not disturb the ice seed crystal in the seed crystal chamber 142. By way of example, the motor 132 may begin operation one minute following the seed crystal chamber sensor 149 determining that the water in the seed crystal chamber 142 has formed ice.

Operation of the motor 132 may continue until the mold sensor 148 determines that the water in the mold chamber 137 has formed ice. In response to the mold sensor 148 determining that the water in the mold chamber 137 has formed ice, the motor 132 may cease operation. Ceasing operation of the motor 132 when the ice formation reaches the mold sensor 148 may reduce wear and tear on the motor 132, as the operation may cease before the agitator 134 is obstructed by ice. Alternatively, the motor 132 may be cycled on and off in a sequence to create a pattern of alternating clear and cloudy ice layers, described herein as a zebra ice pattern. In some configurations, food coloring may be added to the water to produce colored bands in ice exhibiting the zebra ice pattern.

In response to the mold sensor 148 determining that the water in the mold chamber 137 has formed ice, the TEC 126 may further cease operating in cooling mode and may enter into a storage mode that maintains a preprogrammed temperature of a temperature sensing device mounted on the cold plate 112. In some embodiments, the user may activate ice removal by operating the TEC 126 in heating mode to facilitate melting of the ice in the seed crystal chamber 142, the fill channels 140, the fill vents 141, and the seed crystal conduit 144. The heating mode may further facilitate a relatively small degree of melting of the clear ice to facilitate removal of the clear ice from the mold chamber 137. In some configurations, a heating duration may be determined by controlling the cold plate temperature sensor to a predetermined value, for example, 5 degrees Celsius.

In further response to the mold sensor 148 determining that the water in the mold chamber 137 has formed ice, the pump 104 may begin operation to pump water from the overflow reservoir 146 and the fill/drain channel 152 to the supply reservoir 102. In some configurations, the pump 104 may further pump the water from the inlet 114, the seed crystal chamber 142, the fill channels 140, the fill vents 141, and the seed crystal conduit 144 to the supply reservoir 102. In configurations where the inlet 114 and the fill/drain channel 152 are in fluid communication, the pump 104 may pump the excess water back in a single operation.

In response to the pump 104 completing the operation of pumping the excess water back to the supply reservoir 102, and if the user doesn't extract the ice within a given time frame, the TEC 126 may cease operating in heating mode and again begin operating in cooling mode to maintain the clear ice in the mold chamber 137 until removed by the user.

Operation of the frozen substance maker 100 may be driven by a preprogrammed microprocessor. Optionally, the frozen substance maker 100 may include components for providing wireless communication with a computing device of a user, such as a mobile phone device, a smartwatch device, a dedicated remote-control device, a tablet or computer, or the like. For instance, the frozen substance maker 100 may include components for communicating via Bluetooth, Wi-Fi, or the like. By way of example, the frozen substance maker 100 may facilitate remote operation by a user, communicating a status of the frozen substance maker 100 to the user, or the like. Communicating the status of the frozen substance maker 100 may include an indication that the clear ice is ready, an indication that the frozen substance maker 100 is in the process of making the clear ice, an indication that the supply reservoir 102 contains less water than the frozen substance maker 100 employs to form the clear ice, an indication that the frozen substance maker 100 is in an environment too warm to make the clear ice, or the like. For instance, in some configurations, a user may use a mobile device to instruct the frozen substance maker 100 to begin making clear ice and the frozen substance maker 100 may provide a notice to the user via the mobile device when the clear ice has been formed.

Alternately or additionally, the frozen substance maker 100 may include an on-board display or LED indicators for communicating the status and the error codes of the frozen substance maker 100. Alternately or additionally, the frozen substance maker 100 may facilitate operation of the frozen substance maker 100 through a user input such as a button, a switch, the on-board display, for instance, as a touch-screen display, or the like.

In some embodiments, the frozen substance maker 100 may facilitate the formation of multiple units of clear ice, for instance through multiple mold chambers generally corresponding to the mold chamber 137. Alternately or additionally, the frozen substance maker 100 may employ multiple TECs generally corresponding to the TEC 126, multiple cold plates generally corresponding to the cold plate 112, multiple mold bases generally corresponding to the mold base 116, multiple mold tops generally corresponding to the mold top 118, multiple caps generally corresponding to the cap 120, and so on.

In some configurations, the frozen substance maker 100 may facilitate automatic ejection of the clear ice. For instance, an actuator may be employed to encourage the mold top 118 to separate from the mold base 116. The actuator, or further actuators may encourage the clear ice to be transferred to a separate clear ice storage location.

Figure 2:
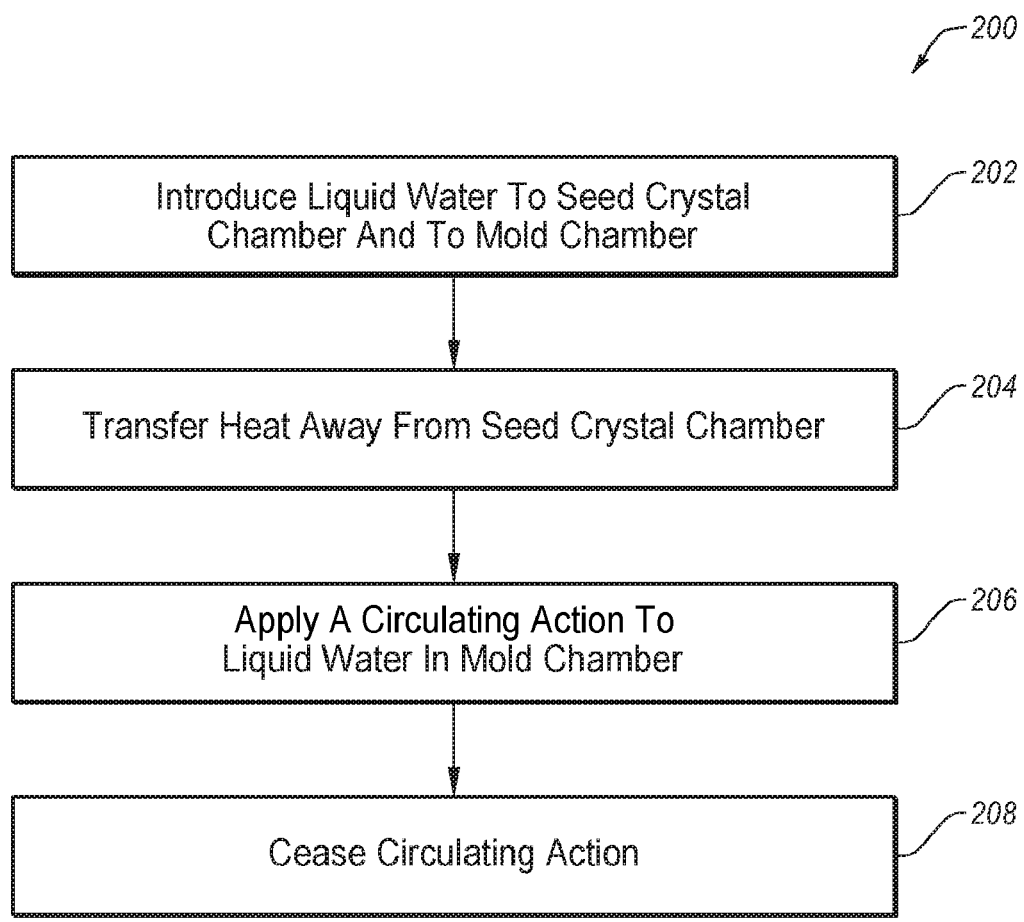
FIG. 2 is a flowchart of an example method of forming clear ice.

FIG. 2 is a flowchart of an example method 200 of forming clear ice. In some embodiments, the method 200 may be performed by a frozen substance maker generally corresponding to the frozen substance maker 100 of FIGS. 1A-1D. For instance, the method 200 may be performed by a preprogrammed microprocessor of the frozen substance maker 100.

The method 200 may begin at block 202 by introducing liquid water to a seed crystal chamber and to a mold chamber in fluid communication with the seed crystal chamber. The seed crystal chamber may generally correspond to the seed crystal chamber 142 of the frozen substance maker 100. The mold chamber may generally correspond to the mold chamber 137 of the frozen substance maker 100. In some embodiments, a portion of the liquid water may be introduced to an overflow reservoir in fluid communication with the mold chamber. In some configurations, the overflow reservoir may generally correspond to the overflow reservoir 146 of the frozen substance maker 100. Alternately or additionally, introducing the liquid water to the seed crystal chamber, the mold chamber, and the overflow reservoir may include pumping the liquid water from a reservoir to the seed crystal chamber until an overflow reservoir sensor determines that the liquid water has contacted the overflow reservoir sensor. In some configurations, the pumping may be performed by a pump generally corresponding to the pump 104 of the frozen substance maker 100. Alternately or additionally, the overflow reservoir sensor may generally correspond to the overflow reservoir sensor 150 of the frozen substance maker 100.

The method 200 may continue to block 204 by transferring heat away from the seed crystal chamber. In some configurations, the heat may be transferred away by a heat pump generally corresponding to the heat pump of the frozen substance maker 100. Alternately or additionally, transferring heat away from the seed crystal chamber may be in response to the overflow reservoir sensor determining that liquid water has contacted the overflow reservoir sensor.

The method 200 may continue to block 206 by applying a circulating action to the liquid water in the mold chamber to discourage oxygen entrapment at the water/ice interface. The circulating action may be applied in response to the liquid water in the seed crystal chamber forming ice. Alternately or additionally, applying the circulating action may include rotating an agitator located at least partially in the overflow reservoir. In some configurations, the circulating action may be performed by a motor and agitator generally corresponding to the motor 132 and agitator 134 of the frozen substance maker 100.

The method 200 may continue to block 208 by ceasing the circulating action. The circulating action may be ceased in response to the liquid water located in the mold chamber forming ice.

In some embodiments, the method 200 may further include determining, by a seed crystal chamber sensor located in the seed crystal chamber, that the liquid water located in the seed crystal chamber has formed ice. In some configurations, the seed crystal chamber sensor may generally correspond to the seed crystal chamber sensor 149 of the frozen substance maker 100.

Alternately or additionally, the method 200 may further include determining, by a mold sensor located at an opening of the mold chamber, that the liquid water located in the mold chamber has formed ice. In some configurations, the mold sensor and the opening of the mold chamber may generally correspond, respectively, to the mold sensor 148 and the opening 147 of the frozen substance maker 100. In some embodiments, in response to determining that the liquid water located in the mold chamber has formed ice, the method 200 may further include draining the overflow reservoir.

Alternately or additionally, the method 200 may further include introducing heat to at least a portion of a mold base defining at least a portion of the mold chamber in response to the liquid water located in the mold chamber forming ice. In some configurations, the mold base may generally correspond to the mold base 116 of the frozen substance maker 100.

Aspects of the present disclosure may be embodied in other forms without departing from its essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A method of forming a clear ice formation from a liquid, the method comprising:
   introducing, through an inlet, a first portion of the liquid to a seed crystal chamber in fluid communication with the inlet and introducing a second portion of the liquid to a mold chamber in fluid communication with the seed crystal chamber via at least a seed crystal conduit;
   transferring heat away from the seed crystal chamber;
   in response to the first portion of the liquid located in the seed crystal chamber forming seed crystal ice in the seed crystal conduit, applying a circulating action to the second portion of the liquid in the mold chamber; and
   in response to the second portion of the liquid located in the mold chamber forming the clear ice formation from the seed crystal ice, ceasing the circulating action.

2. The method of claim 1, wherein introducing the liquid to the seed crystal chamber and the mold chamber further includes pumping the liquid from a reservoir to the inlet, the seed crystal chamber, the mold chamber, and an overflow reservoir in fluid communication with the mold chamber until an overflow reservoir sensor determines that the liquid has contacted the overflow reservoir sensor.

3. The method of claim 2, wherein the transferring heat away from the seed crystal chamber is in response to the overflow reservoir sensor determining that the liquid has contacted the overflow reservoir sensor.

4. The method of claim 2, further comprising determining, by a seed crystal chamber sensor located in the seed crystal chamber, that the second portion of the liquid located in the seed crystal chamber has formed the seed crystal ice.

5. The method of claim 4, wherein applying the circulating action to the second portion of the liquid in the mold chamber includes rotating an agitator located at least partially in the overflow reservoir.

6. The method of claim 2, further comprising:
   determining, by a mold sensor, that the second portion of the liquid located in the mold chamber has formed the clear ice formation; and
   draining the overflow reservoir in response to determining that the second portion of the liquid located in the mold chamber has formed the clear ice formation.

7. The method of claim 1, further comprising, in response to the second portion of the liquid located in the mold chamber forming the clear ice formation, introducing heat to at least a portion of a mold base defining at least a portion of the mold chamber to facilitate removal of the clear ice formation from the mold chamber.

8. The method of claim 1, further comprising, in response to the second portion of the liquid located in the mold chamber forming the clear ice formation, further transferring heat away from the seed crystal chamber to maintain the clear ice formation in the mold chamber until a user extracts the clear ice formation from the mold chamber.

9. The method of claim 1, wherein the mold chamber defines details into the clear ice formation.

10. The method claim 9, wherein the details in the clear ice formation exhibit an appearance of text or of images.

* * * * *